United States Patent [19]
Tranovich

[11] Patent Number: 5,868,165
[45] Date of Patent: Feb. 9, 1999

[54] ROTARY METERING-PIN SERVOVALVE AND METHOD OF MANUFACTURING THE SAME

[76] Inventor: Stephen J. Tranovich, 27348 Brighton Dr., Valencia, Calif. 91354

[21] Appl. No.: 780,753

[22] Filed: Jan. 8, 1997

[51] Int. Cl.$^6$ .................................................. F15B 13/044
[52] U.S. Cl. ............................... 137/625.23; 137/625.24; 251/283
[58] Field of Search ......................... 137/625.23, 625.24; 251/283

[56] References Cited

U.S. PATENT DOCUMENTS

| | | | |
|---|---|---|---|
| 2,806,485 | 9/1957 | Collins et al. | 137/625.23 |
| 2,917,080 | 12/1959 | Hatch | 137/625.65 |
| 2,946,348 | 7/1960 | North | 251/283 X |
| 4,177,834 | 12/1979 | Bonney | 137/625.23 |

*Primary Examiner*—Gerald A. Michalsky
*Attorney, Agent, or Firm*—Fulbright & Jaworski L.L.P

[57] ABSTRACT

A rotary servovalve having a cylindrical spool (18), which rotates through a limited angle, positioned within a housing (16). The spool and housing have transverse holes through both parts with matching position and diameter. The holes in the housing form cylinder ports (21) and (24) for connection to a load. A metering pin (22) is fixed in the opening in the spool and its end surfaces conform to the surface of the spool. These end surfaces block the opposed load ports (21) and (24) when the valve is in the null position. Fluid under pressure and exhaust are applied through the inlet port (20) and return (11) ports to circumferential grooves (23) and (25) on opposite sides of the metering pin, which are narrower than the diameter of the pin. When the spool is rotated, pressure is connected to one of the load ports and return to the opposite port and the resulting flow is proportional to the angle of rotation. The valve is manufactured by positioning the spool, with the groove pre-formed, at the desired point in the housing and clamping them together. A hole is then bored simultaneously through both parts. The metering pin is then sized, inserted into the spool, fixed in place, and its ends are ground to conform to the clindrical surfaces of the spool and the housing.

5 Claims, 5 Drawing Sheets

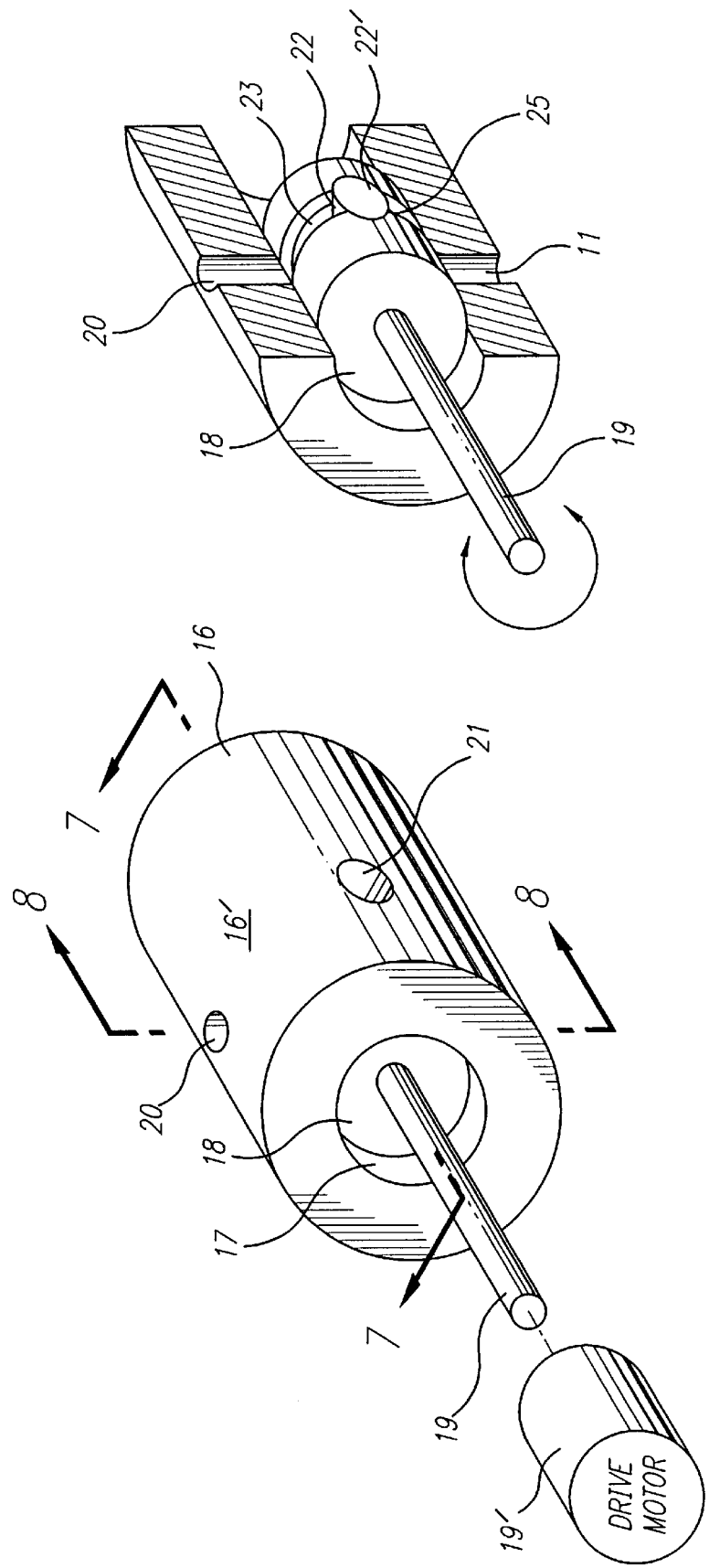

ROTARY METERING-PIN SERVOVALVE AND METHOD OF MANUFACTURING THE SAME

FIELD OF THE INVENTION

This invention relates primarily to electro-hydraulic and electro-pneumatic servovalves and more particularly to a simple rotary spool valve having a unique design and the method of manufacturing such a valve.

BACKGROUND OF THE INVENTION

Electrohydraulic and pneumatic servovalves serve to provide a flow output which is linearly proportional to an electrical input for use in closed loop position control systems. These valves particularly require linear flow gain characteristics through that portion of the flow gain which is concerned with very small inputs and small resulting flows (the null-flow region) in order to maximize both the accuracy and stability of the position control loop and to minimize wasted energy in the form of internal leakage.

Typical electrohydraulic or pneumatic servovalves and proportional valves approach this null-flow problem by a process called flow grinding. In this process, a typical cylindrical spool intended for axial movement in a housing has its edges carefully ground in a process comprising measurement of the actual flow characteristics of each spool land; alternating with careful grinding of the edge with a precision grinder. This approach, if accomplished manually, requires highly skilled labor, precision machines, and substantial time. Automation of this process relieves the requirement for skilled labor and decreases the time, but requires a large investment in machinery. Another approach is to very carefully manufacture the spool and its mating housing or sleeve to attain the correct edge condition. This process requires holding tolerances better than 0.0001 inch on both parts consistently, which is expensive. Finally, the use of electronic compensation circuits to increase the electrical gain to compensate for low hydraulic gain in an overlapped valve results in a more linear flow characteristic. However, this still requires careful machining and processing and also requires that compensation circuits with various gains be available to allow some mismatch in the hydraulic gain.

Some rotary spool servovalve designs do exist in the prior art. Those known to the Applicant are: U.S. Pat. No. 3,007,494 to Herzl; U.S. Pat. No. 4,232,586 to Elser; U.S. Pat. No. 4,290,452 to Takahashi, et al.; U.S. Pat. No. 4,335,745 to Bouveret, et al.; U.S. Pat. No. Idogaki, et al.; U.S. Pat. No. 4,794,845 to Vick; U.S. Pat. No. 4,799,514 to Tanaka, et al.; U.S. Pat. No. 4,800,924 to Johnson; U.S. Pat. No. 4,848,402 to Elser, et al.; U.S. Pat. No. 4,858,650 to Devaud, et al.; U.S. Pat. No. 4,922,949 to Mizukusa, et al.; and U.S. Pat. No. 4,964,612 to Maggioni, et al., which will be discussed below.

To obtain a straight line flow vs. input curve throughout the operating range of the servovalve, most servovalve designs utilize rectangular metering slots which engage with spool lands which have corresponding straight cross sections. These rectangular metering slots require electrical discharge machining (EDM) to very precise tolerances, which is generally a slow and expensive machining method. Although some valves use round-hole ports to avoid this operation, the flow gain resulting from this method is inherently non-linear. In one case (Elrod, et al, U.S. Pat. No. 5,285,715) electronic compensation is used to overcome this problem.

The valve spool mechanization disclosed in this application uses a unique design and manufacturing process to eliminate the requirement for flow grinding of the servovalve spool, while using only simple and readily available machine shop processes to achieve the required lap condition. The design also has the advantage of using very simple part configurations which can be readily machined on standard machine tools. Finally, the round hole ports which are used in this invention require only standard drilling operations to machine, yet the configuration of the round pin in a slot of narrower width results in a linear flow gain curve over the entire valve stroke.

SUMMARY OF THE INVENTION

A design and method of manufacturing an electro-hydraulic or pneumatic servovalve which includes a cylindrical spool which rotates within a housing. The spool and housing have corresponding transverse holes through both members which are drilled simultaneously through the housing and spool during manufacture, thus assuring perfect matching of the position and diameter of the holes. The cylindrical spool is positioned withing the housing and then clamped to preclude movement while the transverse holes are drilled. The hole in the spool is subsequently plugged at each end with a pin lapped to the precise size of the transverse spool hole and ground on its ends to match the curvature of the outside diameter of the spool. The ground ends act to precisely close off the holes in both walls of the housing in the valve's neutral position, and the edges of the ground ends match exactly the periphery of the housing holes. These holes in the valve housing are connected to the two opposing cylinder ports of the servovalve. Other holes in the housing are offset from these cylinder port holes either circumferentially or axially or both (as is further described below) and serve as supply and return ports. Metering is accomplished through circumferential slots in the spool, smaller in width than the diameter of the lapped pin. As the spool is rotated by driving means (such as a limited angle torque motor), the circumferential slots are uncovered in a manner which results in a flow area linearly proportional to the magnitude of the angular displacement of the spool. Further refinements to this concept serve to better balance the pressures on the sides of the spool to prevent undesirable side loading, which would tend to increase friction.

Other objects and advantages of the present invention will become more apparent to those persons having ordinary skill in the art to which the present invention pertains from the following description taken in conjunction with the accompanying drawings.

BRIEF DESCRIPTION OF THE DRAWINGS

FIG. 6 is an isometric schematic representation of a rotary metering pin servovalve constructed in accordance with the principles of the present invention;

FIG. 7 is a partially cutaway view of the valve shown in FIG. 6 with the housing sectioned about the lines 7—7 of FIG. 6;

DETAILED DESCRIPTION OF PREFERRED EMBODIMENTS OF THE INVENTION

Figure 1:
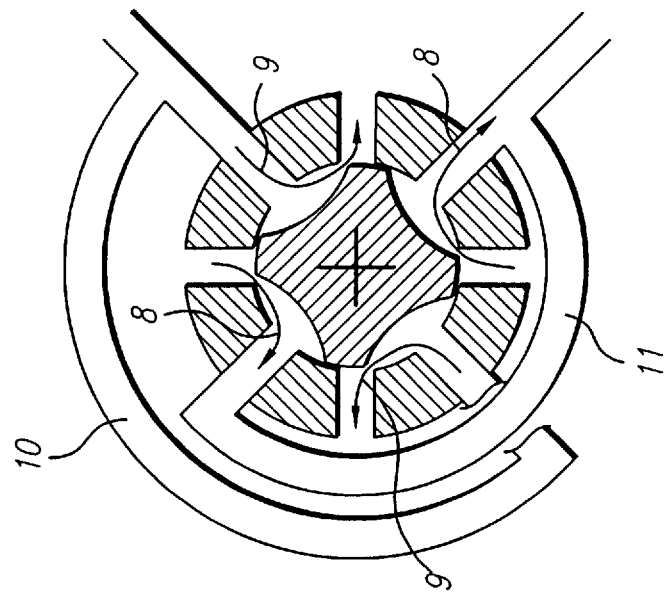
FIG. 1 and 2 illustrate exemplary prior art rotary servovalve construction.
Figure 2:
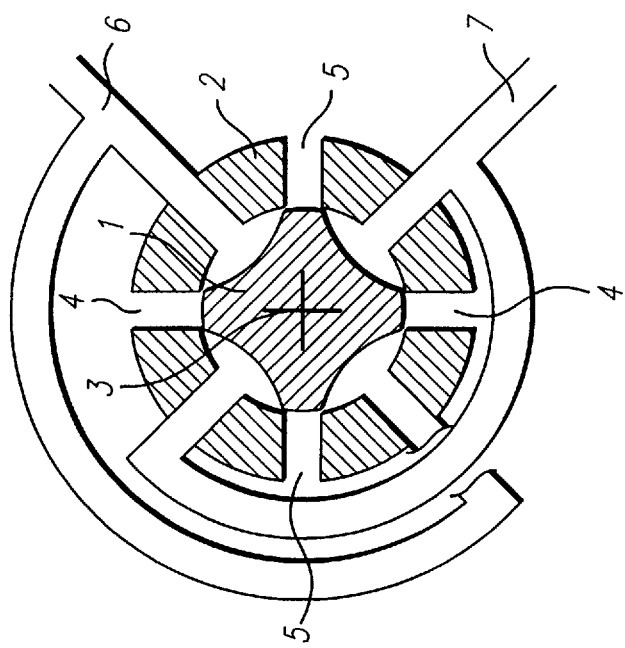

Referring to FIG. 1 most rotary-type valve designs of the prior art intended fir electro-hydraulic servovalve service are of a basic type which has a inner valve member or rotary spool (1) which is generally cylindrical in shape, but cut-out in some fashion to effectively form a cruciform cross section in which the ends of the cross extend to the inner surface of a mating sleeve (2) and slide thereon when rotated about its axis (3). These ends seal mating radial passages in the sleeve containing a supply pressure path (4) and a return path (5), while the cut-out sections of the cross are receptive to the cylinder ports (6) and (7). The result is a conventional four-way valve action, as is illustrated in FIG. 2 wherein the spool has been rotated slightly about its axis in a clockwise direction. Supply pressure follows the fluid flow paths shown by the arrows (8) from the pressure ports to the cylinder ports. Return pressure follows the flow path shown by the arrows (9) from the low-pressure side of the driven load (not shown) to the return ports. All of the pressure, return, and cylinder ports are arranged in opposing pairs to allow a pressure balance across opposing surfaces of the rotary spool, thus requiring a total of six fluid passages in such designs. It should be noted that the fluid passages (10) and (11) which cross-connect the cylinder port pairs can be made internal to the spool instead of external in the housing as is shown in FIGS. 1 and 2. Straightforward examples of valves designed with this principle include those by Devaud et al., Bouveret et al., and Johnson. Johnson shows the cross connection between the cylinder ports internal to the spool as previously discussed. Herzl discloses a spool of generally similar cross section except that the cylinder ports are sealed by the cruciform and the supply and return fluid are fed to the cut-outs.

The major difficulties with designs of this type are related to fabrication of the spool and mating sleeve passages with sufficient precision to set the critical lap condition required by electrohydraulic servovalve applications, since the flow grinding process utilized for axial sliding spool valves is not well suited to these designs. Furthermore, a linear relationship between output flow and input angular displacement can only be accomplished if the ends of the cruciform which are perpendicular to the axis of the communicating sleeve bores are of rectangular cross section. Such a shape involves complex and difficult machining. In addition, the mating communicating sleeve bores must also be of rectangular cross section, necessitating an electrical-discharge machining operation or a sleeve structure consisting of stacked sections which can be individually machined by conventional machine tools. Finally, the six port design in itself requires undesirable complex machining.

Takahashi et al. disclose a similar scheme to that described above in a valve intended for service as a power-steering valve for automotive application, but with the addition of radial plugs, two of which feed supply pressure through axial holes in the plugs and two of which are solid; effectively blocking ports through a hollow spool which accept return flow. Metering is accomplished in cut-out segments in the surface of the spool.

Vick shows a substantially different valve design in which a complicated manifold structure is fabricated by means of a series of stacked laminations. These laminations form passages which extend in an axial direction, parallel to, but not coincident with the spool axis and connecting to the cylinder port passages. The laminations also form slots which communicate radially with the periphery of the spool and with supply and return passages which are radially outward of the spool metering area. These slots are arranged in pairs on opposite sides of the spool. By rotating the spool, supply and return are alternately connected to the axial cylinder port passages, effecting the required four-way valve operation. The spool has through passages perpendicular to the axis of rotation and perpendicular to each other, one each for the supply and return metering functions. It should be noted that Vick mentions the use of a lapped round hole to control the metering function near null. However, this function is substantially different from that disclosed in the present invention in that the hole in the Vick spool is lapped independently of the communicating sleeve passages, which are of different shape, so that the flow grinding process is one of trial and error rather than being accomplished in one operation. Furthermore, Vick uses a parallel rectangular hole to accomplish the linear flow gain requirement and only uses the round hole for the initial metering at null, resulting in a keyhole shaped spool metering edge.

Other types of rotary valves intended for power steering application generally have a splined cross section ground into the periphery of the spool, where those portions of the spline in slidable contact with a concentric sleeve serve to block flow from flow passages formed in the sleeve by grooves which give the sleeve a similar splined cross section. The undercut areas in the spool and the sleeve communicate with supply pressure, return pressure, and the cylinder ports in combination to attain the four-way or other valve action. Examples of patents disclosing such configurations are those by Elser and Elser et al., and that of Tanaka et al. Such valves are generally unsuited for use in electro-hydraulic servovalves because of their open-center design and non-linear flow relationships.

A final type of rotary valve well known by those skilled in the art is the valve in which a cylindrical spool has passages formed perpendicular to its axis of rotation, which passages meet up with passages in a fixed sleeve to allow the flow of fluid. These types of valves generally are not intended for a closed center metering valve such as an electrohydraulic servovalve for use in a precision closed-loop system. Examples of patents disclosing such valves are those by Maggioni et al., Idogaki et al, and Mizukusa et al.

Figure 3:
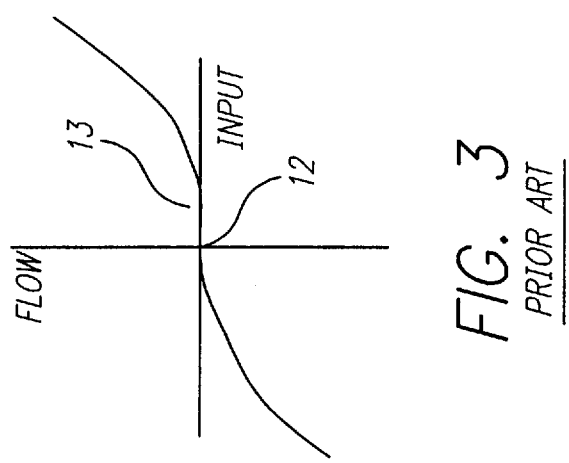
FIG. 3 illustrates graphically the relationship between output flow and input position for an overlapped condition of a generic servovalve mechanization.
Figure 4:
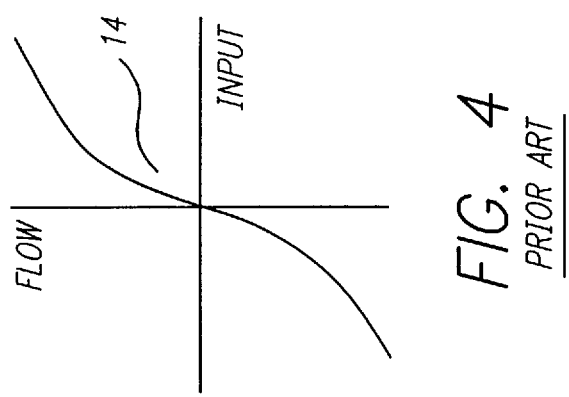
FIG. 4 illustrates graphically the relationship between output flow and input position for an under lapped condition of a generic servovalve mechanism.
Figure 5:
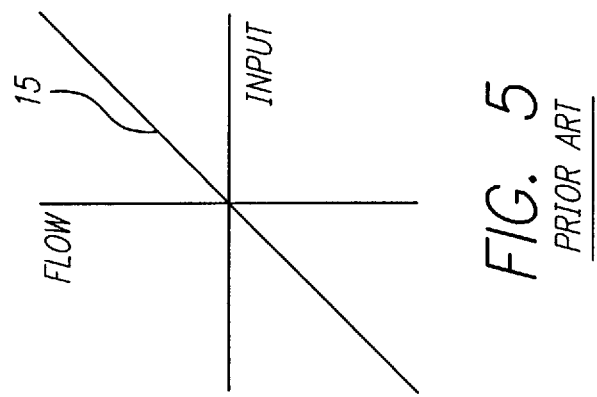
FIG. 5 illustrates graphically the relationship between output flow and input position for a critically lapped condition of a generic servovalve mechanism.

Referring now to FIGS. 3, 4 and 5 which are graphs showing output flow of the controlled fluid vs. input position (for small position inputs) displacement being shown on the abscissa and flow on the ordinate. The null point is the point with no position displacement as shown at (12) and no resulting flow. The overlapped case (FIG. 3) results in a low gain through null as shown at (13), which reduces the frequency response of a position control system incorporating such a valve and decreases position accuracy due to low pressure gain also associated with this condition. The underlapped case (FIG. 4) results in high internal leakage (corresponding to lost power in the system due to wasted flow) and the high flow gain (4) decreases the stability of the system. The pressure gain required for optimum position accuracy is also compromised by this type of lap condition. The critically lapped case (FIG. 5) results in the optimum leakage, consistent gain for optimum system stability (the straight line characteristic shown at (15)), and the best available accuracy.

In FIG. 6, there is illustrated a simple valve constructed in accordance with the principle of the present invention. FIG. 6 shows a cylindrical housing (16) having an exterior surface 16' an axial bore (17)therethrough in which there is disposed a spool (18). The spool (18) has attached thereto means such as a shaft (19) for connection to a source of limited angle rotational movement such as a drive motor (19') (for example a limited angle brushless DC motor, not shown). The valve is a four port device, with a port (20) for the flow of fluid under pressure from a source of supply (not shown); two ports (one being shown at (21)) for connection to the driven load actuator (not shown) (the other is on the opposite side of the housing (16) and is not shown), and a port (11) for connection of the low pressure return fluid from the load. The ports terminate at the exterior surface 16' of the housing 16. In the partial cutaway view of FIG. 7, a transversely mounted metering pin (22) within the spool (18) can be seen, which serves to close-off the cylinder ports (21) when the valve is in its closed condition. For example, the surface (22') of the metering pin (22) which can be seen in FIG. 7 would close off port (21) in FIG. 6 when in the null-flow position. It should be noted that the spool (18) and housing (16) are symmetrical and that the opposite end of the metering pin (22) would function to close off the opposite cylinder port, which is not visible. Also apparent in the spool is a circumferential groove (23) which is interrupted by the metering pin (22) on both sides of the spool (18). This groove (23) serves as the connection to the supply and return flow and is structured such that its width is less than the diameter of the metering pin (22). This allows the circumferential groove to be effectively segmented or divided into two grooves as shown at (23) and (25) (one for supply and one for return) and also serves to allow for linear flow vs. position gain throughout the valve stroke, as will be more fully explained in the discussion of FIG. 10.

Figure 9:
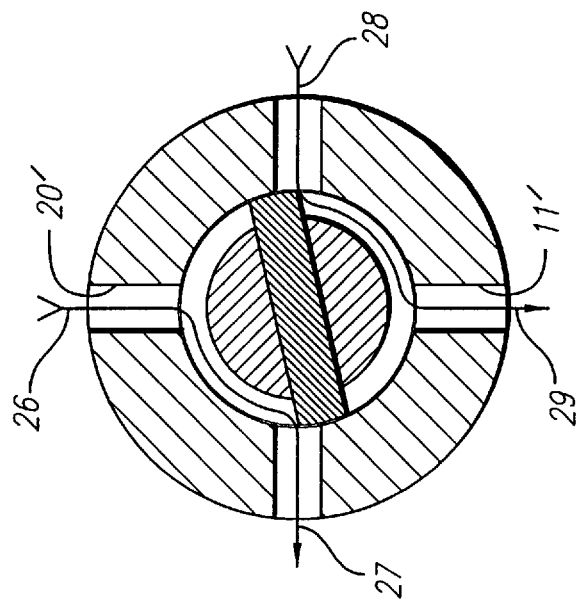
FIG. 9 is a cross-sectional view like that of FIG. 8 but with the spool rotated counter clockwise to illustrate the flow of fluid through the valve.
Figure 8:
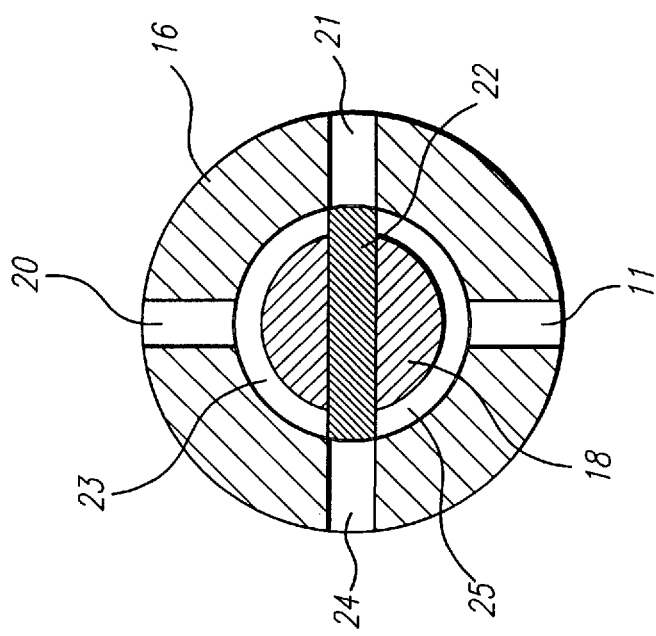
FIG. 8 is a cross-sectional view of the valve shown in FIG. 6 taken about the lines 8—8 of FIG. 6 and showing the valve in its null position.

In FIG. 8 and 9, the basic functioning of the valve is illustrated. In FIG. 8, the valve is shown in its closed or null condition. It can be seen that the metering pin (22) is aligned with the cylinder ports (21) and (24), and that thus no fluid is allowed to pass into or out of the cylinder ports (21) and (24) from the segmented grooves (23) and (25). FIG. 9 shows the valve spool (18) rotated counterclockwise about its axis into a maximum opening condition. In this condition, fluid follows the path shown from (26) to (27) through the first passage way means 26', corresponding to fluid flow from the pressure port (20) through the circumferential groove (23) to cylinder port (24). Return flow from the actuator (not shown) flows from (28) to (29) through the second passage way means 11', corresponding to fluid flow from the other cylinder port (21) through the other side (25) of the circumferential groove (15) back to the return port (11). Clearly, rotation of the spool in the clockwise direction results in fluid flow in exactly the opposite direction.

Figure 10:
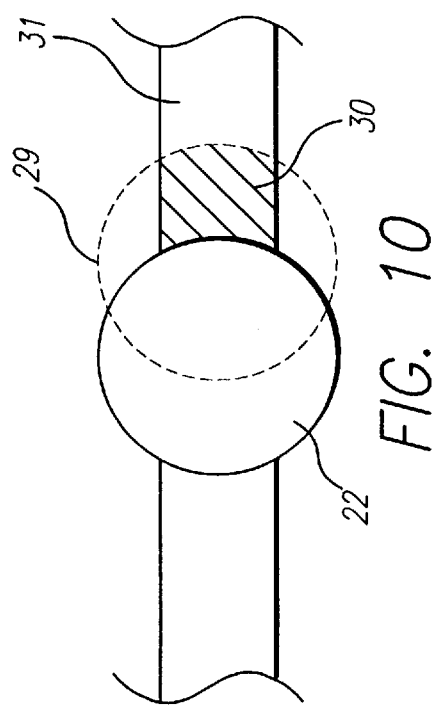
FIG. 10 is a planar view of the cylindrical interface between an orifice in the housing and a plug in the rotor to illustrate the geometry of the valve opening as it is actuated.

In FIG. 10, the interface between the outside diameter of the spool and the inside diameter of the housing is shown in a planar view to better visualize the effect of displacement and the geometry of the metering path with rotation of the spool (18). The metering pin (22) initially covers the cylinder port (29) in the null position as shown in FIG. 8. As the spool is rotated through an angle resulting in an equivalent linear displacement, a section (30) of the circumferential groove (31) is uncovered. Fluid under pressure resident in the groove segment (31) will flow through the uncovered portion (30) (shown cross-hatched). Although this section has circular arcs at each of its ends due to the circular geometry of the metering pin and port, the area of these circular arcs remains constant, while the area of the opening varies linearly with the displacement. Since the output flow is a linear function of the area of the opening, the valve has the desirable feature of having a flow output which varies linearly with displacement.

A key feature of the invention is the method of manufacture which results in the desired line-to-line lap condition. The spool with the grooves formed therein is mechanically held in its operating position both axially and rotationally by clamping during the machining operation. One means of accomplishing this is to use the actual components which retain the spool during normal operation (for example, an end plate and bearing could locate the spool axially in operation). After clamping in position (the null position illustrated in FIG. 8), a transverse hole is bored through both the housing (16) and the spool (18) simultaneously and at their desired position. The circumferential groove may be formed before or after the transverse hole is formed. The spool is then removed from the housing and the metering pin (22), which is slightly longer in length than the diameter of the spool, is precisely fit to and received within the transverse hole in the spool by the use of well known lapping or polishing operations such that the pin effectively seals the hole in the spool. The metering pin is then ground to match the curvature of the outside diameter of the spool, and the spool to housing clearance and finish are established by lapping or other conventional operations. Although a single pin (22) has been illustrated and described for defining the metering element in the spool it should be understood that rods of length sufficient to seal the hole in the spool and to define each metering surface may be used. Such rods may be lapped and fitted as above-described or otherwise secured in place by a cement, threading or the like.

Figure 11:
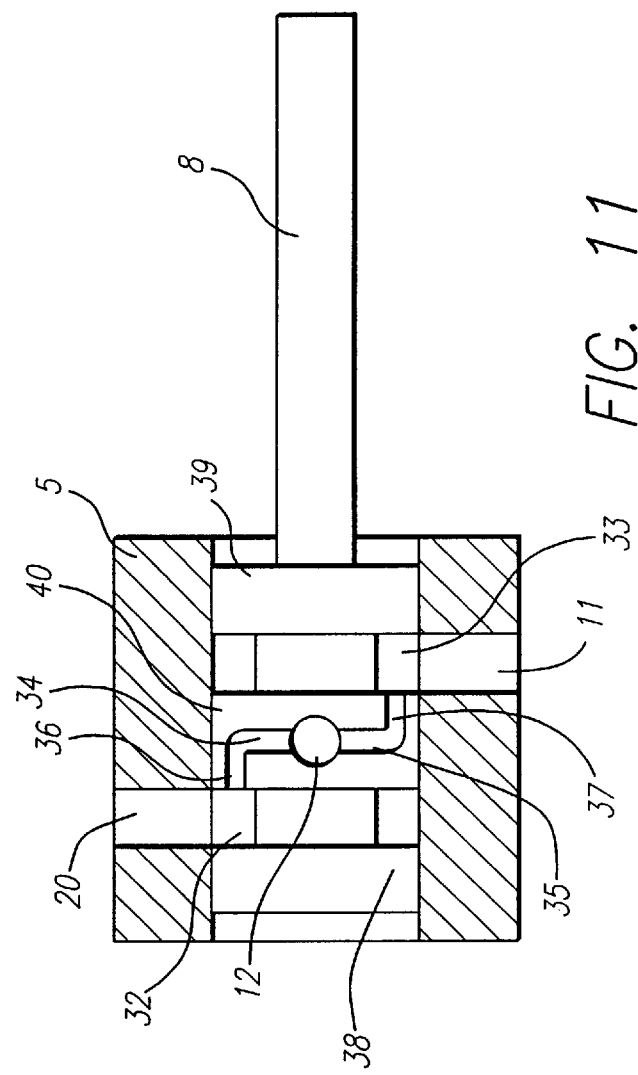
FIG. 11 shows a cross-sectional view of a preferred embodiment of the invention which incorporates means to reduce the undesirable effects of pressure sideloading.

It will be apparent to those skilled in the art that the spool arrangement described in the preceding paragraphs, although it has the virtue of simplicity, has an undesirable feature. The portion of the circumferential groove which is exposed to supply pressure amounts to almost half of the circumference of the spool, while the portion exposed to the return pressure is diametrically opposite. This results in a side load on the spool proportional to the supply pressure, which can result in excessive friction, which in turn is undesirable for a servovalve. To obviate this problem, a design modification is made in the preferred embodiment of the invention in which the portion of the circumferential groove exposed to unbalanced supply pressure is greatly decreased and the remaining portion is partially offset by supply pressure on the opposing side. Referring now to FIG. 11, two circumferential grooves (32 and 33) are cut in the spool around the entire periphery thereof and are exposed to supply and return pressure, respectively from ports (20) and (11). These grooves define lands 38, 39 and 40 on the spool. Since the supply pressure is identical throughout groove 32, and the return pressure is identical throughout groove 33, no side loading results from these grooves. The required metering grooves (34) and (35) are machined as before, but instead of extending around the entire circumference of the spool (18), they are limited in length to the required length for the valve stroke and are formed in the surface of land (40). This groove is then connected to the supply groove (32) by an axial groove (36) and to the return groove (23) by another axial groove (37). The opposite side of the spool land (40) which is symmetrical, contains the exact same configuration. It can be seen that the limited length of the groove (34) which is exposed to supply pressure and which is offset by a similar pressure groove on the opposite side of the spool results in a more pressure balanced configuration and resulting lower frictional drag.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A rotary metering pin servovalve comprising:

a housing means having an exterior surface and defining an internal cylindrical surface disposed within said housing;

an inlet port at said exterior surface for connection to a source of fluid under pressure and a return port at said exterior surface for connection to an exhaust;

means affixed to said spool for rotating said spool through a limited angle within said housing;

a cylindrical spool rotationally disposed within said housing and having an outer cylindrical surface in slidable contact with said internal cylindrical surface;

said housing and said spool defining an aligned opening extending completely therethrough, said opening defining first and second diametrically opposed load ports terminating at said exterior surface of said housing;

said aligned opening also defining first and second ends in said spool;

pin means inserted into and sealing said first and second ends of said aligned opening through said spool and having first and second surfaces, said first and second surfaces being formed to conform to said internal and outer cylindrical surfaces and to close said first and second load ports when said first and second surfaces are aligned therewith;

said spool defining metering groove means having a width smaller than the diameter of said pin means and terminating on opposite sides of said pin means at both of said first and second surfaces thereof; and first passage way means connecting said inlet port said metering groove means on one side of said pin means and second passageway means connecting to said return port to said metering groove means on the other side of said pin means whereby a source of fluid under pressure from said inlet port is connected to one of said first and second load ports and the other of said first and second load ports is connected to said return port when said spool is rotated through a limited angle within said housing.

2. A rotary servovalve as described in claim 1 wherein said metering groove means are significantly smaller in width than the diameter of said pin means whereby said output flow is linearly proportional to the magnitude of said limited angle.

3. A rotary servovalve as defined in claim 1 wherein said pin means is a unitary cylindrical pin extending completely through said spool.

4. A rotary servovalve as defined in claim 1 further including additional groove means formed on said spool including first and second spaced apart grooves formed circumferentially on said spool and separated by a land having a surface engaging said internal cylindrical surface and wherein said metering groove means are formed on said land surface and consist of third and fourth diametrically opposed grooves unconnected with each other and each being interrupted by opposite sides of said pin means; said additional groove means also including fifth, sixth, seventh, and eighth axial grooves formed on said land surface so that proximal ends of said third and fourth grooves are connected to said first groove through said fifth and sixth grooves and the opposite ends of said third and fourth grooves are connected to said second groove through said seventh and eighth grooves, said first and second grooves communicating with said inlet port and said return port respectively.

5. A rotary servovalve as defined in claim 4, wherein said third and fourth grooves are limited in length to approximately the operating stroke of said valve.

\* \* \* \* \*